United States Patent Office 3,374,029
Patented Mar. 19, 1968

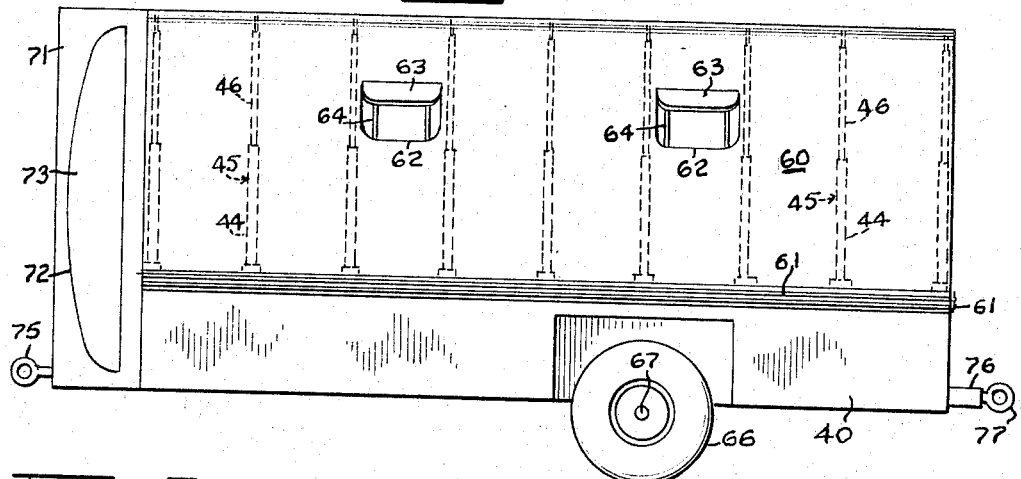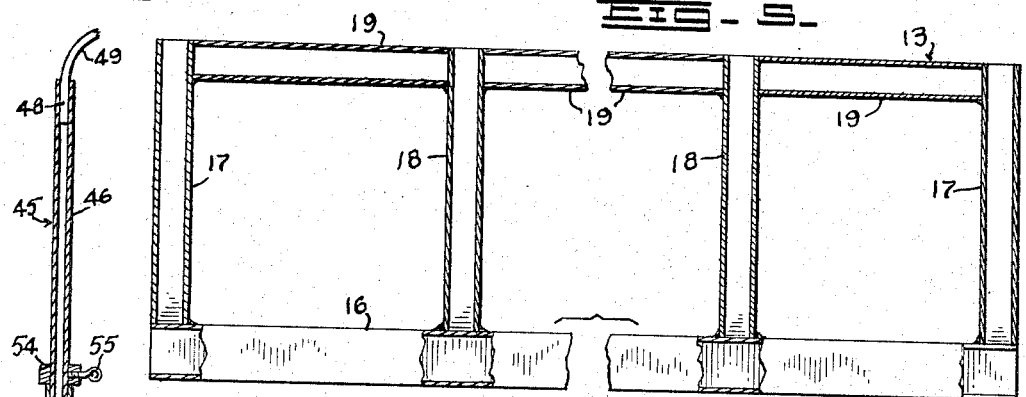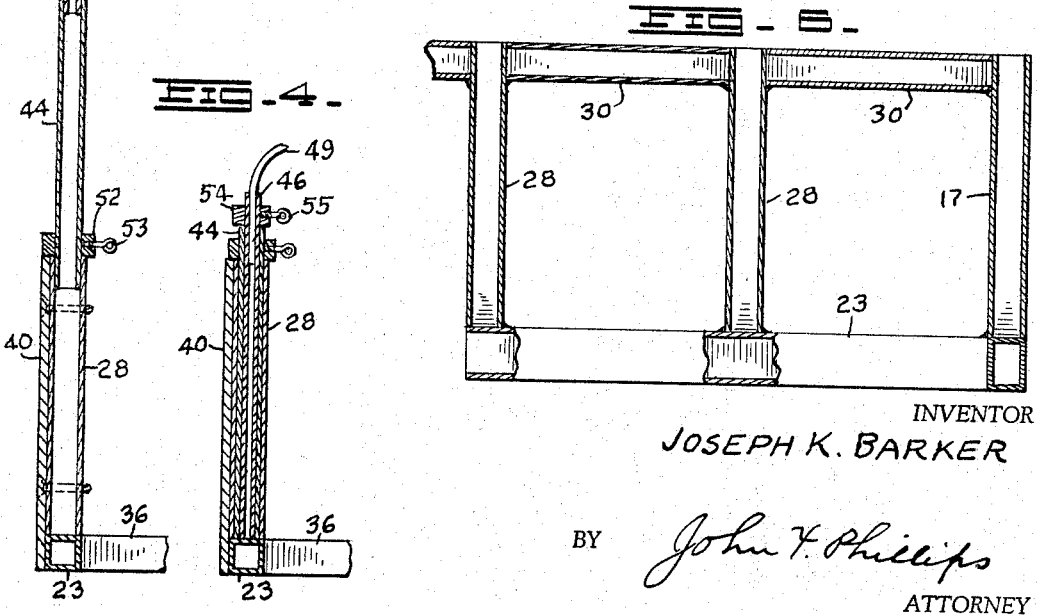

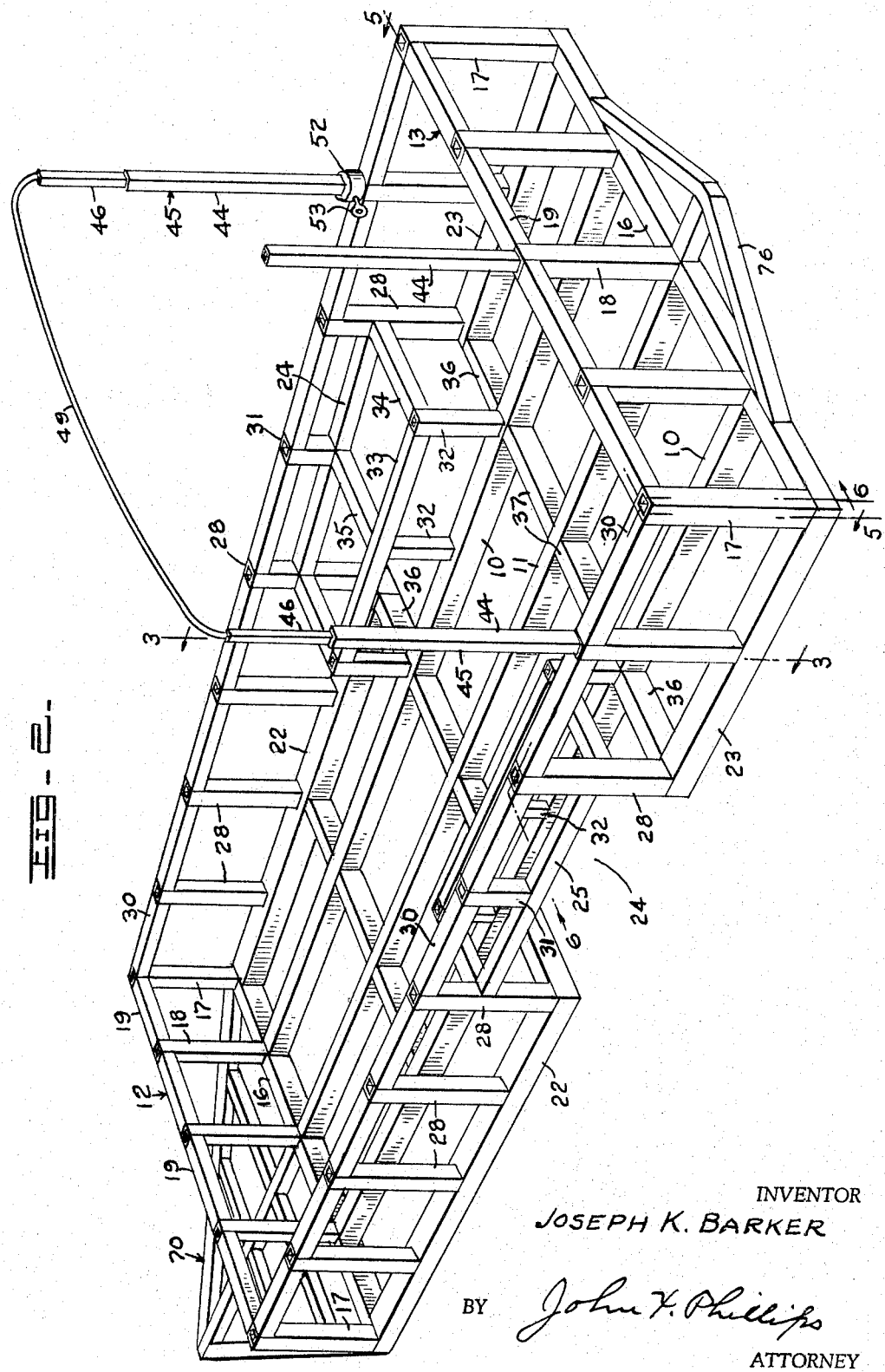

3,374,029
TRAILER CONSTRUCTION
Joseph K. Barker, Rte. 2, Abingdon, Va. 24210
Filed Oct. 14, 1965, Ser. No. 496,071
7 Claims. (Cl. 296—28)

ABSTRACT OF THE DISCLOSURE

A vehicle body, and more specifically, a trailer body, is made up of hollow structural elements of square cross section, including upper and lower side frame members and vertical members, the upper members being made up of short aligned sections cut off square at their ends and welded in solid abutting relationship with the adjacent flat surfaces of the vertical members, all outer surfaces of the upper and lower side frame members and the vertical members being flush in a common vertical plane so that a closure and rigidifying panel can be secured to all of such flush faces.

---

This invention relates particularly to a trailer construction, and relates more broadly to shelter constructions including not only trailers but boats and tent-like constructions.

An important object of the invention is to provide such a structure including a novel type of body framing, including elements serving as sockets to receive the lower ends of post units over which a cover is arranged.

A further object is to provide such a frame structure including vertical elements open at their upper ends to receive the lower ends of post units for the purpose stated.

A further object is to provide a combination of elements wherein the post units are sectional and vertically adjustable to permit the lowering of the cover and its supporting means to render the structure more compact to facilitate transporting the construction without dismantling it, it being particularly practicable to transport the trailer by helicopter.

A further object is to provide a frame structure of the type referred to wherein polygonal, and more specifically, square elements are utilized and wherein the vertical open topped elements are arranged in the plane of their respective sides, elements of the sides of the frame extending horizontally thereof being welded at their ends to the open topped vertical members.

Other objects and advantages of the invention will become apparent during the course of the following description.

In the drawings I have shown one embodiment of the invention. In this showing:

FIGURE 1 is a side elevation of a trailer embodying the invention;

FIGURE 2 is a perspective view of the frame structure and certain associated elements;

FIGURE 3 is a section on line 3—3 of FIGURE 2 showing the sectional post elements extended;

FIGURE 4 is a similar view showing the post sections lowered;

FIGURE 5 is a section on line 5—5 of FIGURE 2; and

FIGURE 6 is a similar view on line 6—6 of FIGURE 2.

Referring to the drawings and particularly FIGURE 2, numeral 10 designates a pair of parallel main frame members extending longitudinally of the vehicle. The central longitudinal frame member 11 is arranged between and parallel to the frame members 10.

At the forward and rear ends of the frame are respectively arranged end frame structures indicated respectively as a whole by the numerals 12 and 13. These frame structures include a lower unitary transverse frame member 16 welded to the ends of the frame members 10 and 11 and projecting laterally therebeyond. On top of each transverse frame 16 at each end thereof is arranged a corner post 17 open through the top thereof, as shown, and each being preferably square in cross-section. Equally distantly spaced across each frame member 16 is arranged a plurality of vertical members 18, preferably of the same cross-sectional size and shape as the corner posts 17. The elements 17 and 18 are welded at their lower ends to the transverse members 16.

Between the upper ends of each adjacent pair of vertical elements 18 and between each post and the adjacent member 18 is arranged a horizontal frame section 19 welded at its ends to the adjacent posts 17 and vertical elements 18. It will be noted that the elements 17, 18 and 19, together with the associated transverse member 16 are arranged in a common vertical plane. Since the posts 17 and elements 18 are square in cross-section, the horizontal sections 19 are squared at their ends and solidly butt welded to the associated members 17 and 18. The members 19 at each end of the frame form in effect a solid beam-like structure of great rigidity. At the same time the elements just described may be made relatively light to minimize the total weight of the construction. It is pointed out that for the sake of clarity and illustration, the open topped vertical elements in FIGURE 2 have been shown disproportionately large in cross section.

At each side of the frame is arranged a pair of aligned frame members 22 and 23 spaced at their adjacent ends from each other to form a wheel well 24, as further described below. The members 22 and 23 at opposite sides of the vehicle frame are spaced outwardly from and parallel to the main frame members 10. Within the space between each pair of frame members 22 and 23 is arranged a brace 25 arranged above the horizontal plane of the members 22 and 23. Each member 22 and 23 supports a plurality of open topped members 28 welded at their lower ends thereto with the members 28 at each side of the frame structure lying in a common vertical plane. These members 28 at each side of the frame structure include therewith the associated corner posts 17, as will be obvious, and one of the vertical members 28 is arranged adjacent each end of each wheel well 24, as clearly shown in FIGURE 2. The brace member 25 is welded at its ends to the adjacent members 28.

Between each adjacent pair of members 28 and between the remote members 28 and posts 17 is arranged a horizontal frame element 30 similar to the members 19. The two horizontal members 30 within the longitudinal limits of the wheel well at each side of the frame are welded to a short vertical element 31, the lower end of which is welded to the associated brace member 25. All of the elements 17, 22, 28, 30 and 31, at each side of the frame construction lie in a horizontal plane.

Each of the main frame members 10 inwardly of the wheel well 24 supports a plurality of relative short vertical members 32 welded thereto, and between the upper ends of the members 32 extends a horizontal brace 33 welded to the remote members 32 and to the top of the intermediate member 32. Transverse braces 34 are welded at their inner ends to the remote members 32 and to the horizontal brace member 33 at opposite sides of the frame, and the outer ends of the members 34 are welded to the associated members 28 and 31. Intermediate braces 35 are welded at their ends to the members 24 and 33.

The longitudinally remote ends of each wheel well 24 are defined by a transverse brace 36. These braces at opposite sides of the frame are aligned with each other and with intervening braces 37 welded at their ends to the frame members 10 and 11.

The sides of the frame are covered by suitable panels 40 (FIGS. 1, 3 and 4) fixed in any suitable manner to the outer faces of members 17, 22, 28, 30 and 31. All these faces are flush with each other and accordingly the side panels 40 engage and may be rigidly secured against all of these faces and serve as a brace to prevent any distortion of the elements making up the vehicle side frames. One of the panels 40 is shown in position in FIGS. 3 and 4 of the drawings. It will be obvious that similar panels (not shown) will be arranged against the end faces of the frame. It will also be apparent that the space within the walls of the frame will be suitably floored. Such floor has not been shown and forms no part of the present invention.

The vertical elements 28 at opposite sides of the frame serve as sockets to receive the lower sections 44 of supporting posts indicated as a whole by the numeral 45. Each post section 44 corresponds in cross-sectional shape and size to the inside of each vertical member 28 to slide vertically therein. Within the upper end of each post section 44 is slidable an upper section 46, corresponding in cross-sectional shape to the post sections 44. Each post unit 45 is arranged directly opposite a post unit at the other side of the frame, and the upper end of each section 46 is adapted to receive the straight vertical lower end 48 of a roof bow 49 (FIGURE 2). It will be apparent that one of the post units has its lower section 44 slidable in each of the vertical members 17 and 28 at each side of the trailer, as suggested in FIGURE 1.

Normally each post section 44 extends only a relatively slight distance downwardly in its associated member 28, as shown in FIGURE 3, and its downward movement is limited by a collar 52 provided with a set screw 53 to clamp the collar 52 to the associated section 44. A similar collar 54, provided with a set screw 55, surrounds each post section 46 and is engageable with the upper end of the associated section 44 to limit downward movement of each section 46. One of the collars 52 has been shown in FIGURE 2, while the others have been omitted to show the interengagement of the telescoping post sections.

Flexible cover 60 is arranged over the roof bows 49 and extends downwardly at opposite sides of the trailer over the post units 45. The lower edges of the cover are clamped beneath the longitudinal plate 61 secured against each side panel 40. This clamping means forms no part of the present invention, and is disclosed and claimed in my copending application Ser. No. 495,969, filed Oct. 14, 1965, now Patent No. 3,326,597, issued June 20, 1967. The cover 60 may be made of any suitable flexible material, such as sheet plastic or rubber, or of a fabric such as heavy water-proof canvas. In practice the cover is made of inner and outer canvas layers with an insulating filler therebetween. The specific structure of the cover 60 forms no part of the present invention. Opposite sides of the cover are preferably provided with windows 62 adapted to be closed by flaps 63, and supportable in open position by props 64.

In each well 24 is arranged a wheel 66 mounted on an axle 67 resiliently supported in any suitable manner relatively to the frame structure. The wheels and the supporting means therefor form no part of the present invention and it will be apparent that they may be omitted and a water-tight construction employed beneath the frame so that the vehicle may float on water. If desired, such structure and the wheels may be employed so that the vehicle may be amphibious.

At one end of the frame (FIGURE 2) is preferably extended a triangular frame structure indicated as a whole by the numeral 70 and on which may be arranged a platform covered by vertical triangular structure 71 (FIGURE 1) having an entrance opening 72 normally closed by flap 73. This forms an entrance vestibule wholly as a matter of convenience and such vestibule forms no part of the present invention.

The forward end of the main frame is provided with any suitable type of hitch 75 by which the trailer may be towed. Since two or more of the trailers may be pulled in a train, the rear end of the trailer (FIGURE 2) is provided with a projecting frame 76 to which is connected a suitable trailer hitch 77.

*Operation*

The frame of the construction possesses a high degree of rigidity, while being made of relatively light, preferably steel, elements. All four sides of the frame include vertical elements of square cross section, open at their upper ends to receive post sections 44. Such sections are usually not employed at the ends of the vehicle since one of the post units will be arranged at each corner of the frame with opposite corner post units connected by roof bows 49. However, end post units may be employed, as suggested by post section 44 in the rear end of the frame in FIG. 2 and the upper sections associated therewith may be connected in any suitable manner with the roof bows of the end cover supporting units.

All of the elements of the frame are square or rectangular in section and this is particularly important as to the horizontal elements 19 and 30 and all of the vertically arranged elements, such as the members 17, 18 and 28.

The use of such structural elements permits the direct square welding of each short horizontal member 19 and 30 directly to the vertical members throughout the lengths of the horizontal members referred to. This welding is shown in FIGURES 5 and 6 between the vertical members 17 and 18 and the transverse member 16 and transverse member 19. In FIGURE 6 the elements 17 and 28 have been shown welded at their lower ends to the structural member 23 and at their upper ends to the horizontal elements 30. This provides not only for a highly rigid construction but permits the upper ends of all of the vertical members of the frame to be open to receive post sections 44. Additionally, it provides for flush opposite faces of the frame so that the side panels 40 may be connected to any or all of the frame members with which they contact. Accordingly, the panels 40 serve to rigidify the vertical and horizontal elements of the sides of the frame.

The parts of the post units normally occupy the positions shown in FIGURE 3. The straight ends 48 of the roof bows are merely slidingly inserted in the upper ends of the post sections 46 and then downward movement is limited by the adjacent curved portions of the bows. The collars 54 support the post sections 46 relative to the sections 44 and the latter are supported relative to the vertical frame members such as the members 28 by the collars 52.

For transportation purposes it is desired to render the structure as compact as possible without dismantling any of the parts. It is particularly pointed out that the present construction is adapted for use by the military and can be transported to points adjacent a battlefield by helicopters. When it is desired to minimize overall height of the construction, the collars 52 and 54 are loosened whereupon the post sections 44 are slidable downwardly into engagement with the adjacent horizontal frame member, this being the frame member 23 in FIGURE 3. Each post section 46 similarly slides downwardly to the same limit of movement, thus reducing the overall height of the construction by substantially 50%.

The only post unit which cannot be so telescoped is the one associated with each of the vertical members 31 since downward movement of the corresponding post section 44 is limited. To take care of this situation, the collars 52 and 54 are loosened and the cover structure elevated, whereupon the post units 45 associated with the sockets 31 may be removed and placed inside of the vehicle. This is readily done by moving the corresponding post sections 46 downwardly, lifting the associated roof bow to remove it from such post sections 46, and then removing the post sections from the sockets 31.

It is to be understood that the form of the invention shown and described is to be taken as a preferred example of the same and that various changes in the shape, size and arrangement of parts may be made as do not depart from the spirit of the invention or the scope of the appended claims.

I claim:

1. In combination, a horizontally elongated frame having sides made up of upper and lower horizontal elements and open topped vertical elements, said horizontal and vertical elements being of identical square cross sectional shape, said upper horizontal elements at each said side being formed of relatively short aligned sections having squared ends each butting against and welded throughout to a flat face of one of said vertical elements, and a cover supporting structure comprising units above and transverse to said frame, each unit comprising vertical post sections at opposite ends thereof, each post section having a lower end vertically slidable in one of said vertical elements.

2. In combination, a horizontal frame having opposite sides formed of upper and lower horizontal structural elements and open topped vertical elements, said horizontal and vertical elements being of rectangular cross sectional shape and of the same width transversely of the frame with their outer faces flush in a common plane, said upper horizontal elements at each side being formed of relatively short aligned sections having squared ends each butting against and welded throughout to a flat face of one of said vertical elements and a roof supporting structure comprising a plurality of post units at each side of said frame, each post unit being transversely aligned with a post unit at the other side of said frame, each post unit having a lower end slidable in one of said open topped elements.

3. The combination defined in claim 2 wherein each post unit is provided with means for limiting its downward movement relative to said frame to determine the height of said roof bows above said frame.

4. The combination defined in claim 2 wherein each post unit comprises a lower post section slidable in one of said open topped elements, and upper post sections each slidable in the upper end in one of said lower post sections, means for limiting downward movement of said lower post sections relative to said frame, and means for limiting downward movement of said upper post sections relative to said lower post sections.

5. The combination defined in claim 2 wherein said open topped vertical elements are of hollow square cross-section, said upper horizontal frame elements comprising a plurality of short sections of square cross section arranged between said open topped elements and welded throughout their ends in alignment with each other to said open topped elements.

6. The combination defined in claim 2 wherein said open topped vertical elements are of hollow square cross-section, said upper horizontal frame elements comprising a plurality of short sections arranged between said open topped elements and welded at their ends in alignment with each other to said open topped elements, the outer surfaces of said lower structural elements of each of said sides lying in said common vertical plane, and a panel secured against said surfaces at each side of said frame.

7. The combination defined in claim 2 wherein said open topped vertical elements are of hollow square cross-section, said upper horizontal elements comprising a plurality of short sections of square cross-section arranged between said open topped elements, the ends of said short sections being squared perpendicular to their length and seating squarely against the respective open topped elements and welded thereto, said short sections having horizontal upper surfaces flush with the upper ends of said open topped elements.

References Cited

UNITED STATES PATENTS

| D. 144,900 | 6/1946 | Boepple | 296—43 X |
| 993,890 | 5/1911 | Shoemaker | 296—43 |
| 1,184,129 | 5/1916 | Quinn | 296—8 |
| 1,572,029 | 2/1926 | Nelson et al. | 296—43 |
| 2,324,508 | 7/1943 | Johnson | 296—104 |
| 2,365,940 | 12/1944 | Couse | 296—104 X |
| 2,731,292 | 1/1956 | Cole | 296—43 |

FOREIGN PATENTS 404,213   10/1924   Germany.

RICHARD J. JOHNSON, *Primary Examiner.*

BENJAMIN HERSH, *Examiner.*

J. A. PEKAR, *Assistant Examiner.*